United States Patent [19]
Shiotani et al.

[11] 3,842,944
[45] Oct. 22, 1974

[54] SHOCK ABSORBER FOR AUTOMOBILES

[75] Inventors: Shigeo Shiotani; Harumi Magusa; Tadaaki Oiwa, all of Nagoya, Japan

[73] Assignee: Sumitomo Chemical Company, Limited, Osaka, Japan

[22] Filed: June 8, 1973

[21] Appl. No.: 368,339

[30] Foreign Application Priority Data
June 9, 1972   Japan.................................. 47-58055

[52] U.S. Cl.................................. 188/1 C, 293/70
[51] Int. Cl............................................ F16f 7/12
[58] Field of Search................... 117/132 C; 156/78; 188/1 B, 1 C, 268; 280/150 B; 293/70

[56] References Cited
UNITED STATES PATENTS

| | | | |
|---|---|---|---|
| 2,724,463 | 11/1955 | Becker | 188/1 C |
| 3,010,540 | 11/1961 | Dahlen | 188/1 C |
| 3,160,549 | 12/1964 | Caldwell et al. | 188/1 B X |
| 3,380,557 | 4/1968 | Peterson | 188/1 C |
| 3,617,364 | 11/1971 | Jarema | 117/132 BF |
| 3,660,149 | 5/1972 | Kucsma et al. | 117/132 C |
| 3,721,433 | 3/1973 | Sobel | 188/1 C X |

*Primary Examiner*—Duane A. Reger
*Attorney, Agent, or Firm*—Stevens, Davis, Miller & Mosher

[57] ABSTRACT

Energy absorbing efficiency of a metallic shock absorber having a hollow structure can be remarkably increased by filling the hollow space with a foamed product of a metal such as aluminum.

2 Claims, 4 Drawing Figures

SHOCK ABSORBER FOR AUTOMOBILES

The present invention relates to a shock absorber for automobiles which is filled with a metal foamed product.

When an automobile crash against another body, it is important to absorb the shock caused by the crash from a part of body of the vehicle to reduce dangers for the drivers. For this purpose, various shock absorbing methods have been proposed and among them a simple absorbing mechanism is preferred. One of them is the use of hollow cylindrical or case-like metallic structures. According to such method the shock energy is absorbed during the time that the hollow structure itself is plastic-deformed and compressed. Said hollow structures may be made of various metals or alloys thereof. Some of them display a high yield strength at initiation of deformation depending on mechanical properties of the metals or alloys thereof or the designed structure of the hollow body. The aspect of the absorption in case of a hollow case made of steel plate is shown by the compression load-strain curve indicated by solid line in FIG. 1 attached hereto. That is, the case has a high energy absorbing efficiency at crash, which reduces to a low level on the next moment. Said low level absorbing efficiency lasts until the end of absorption of energy. Since the amount of energy absorbed is represented by the area of oblique lines in FIG. 1, a large amount of strain (namely, a large amount of deformation) is responded to an energy absorbing efficiency of low level.

Figure 1:
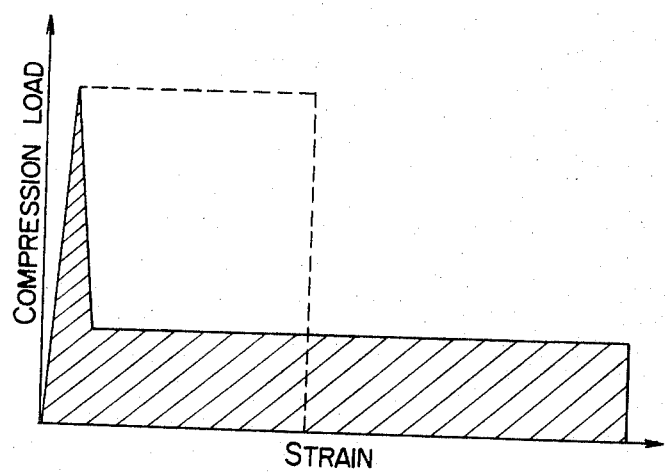
Figure 2:
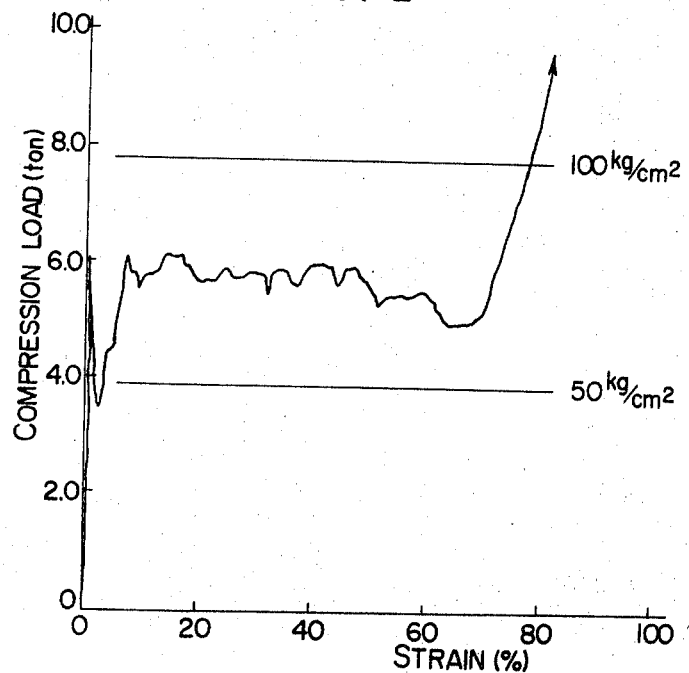
Figure 3:
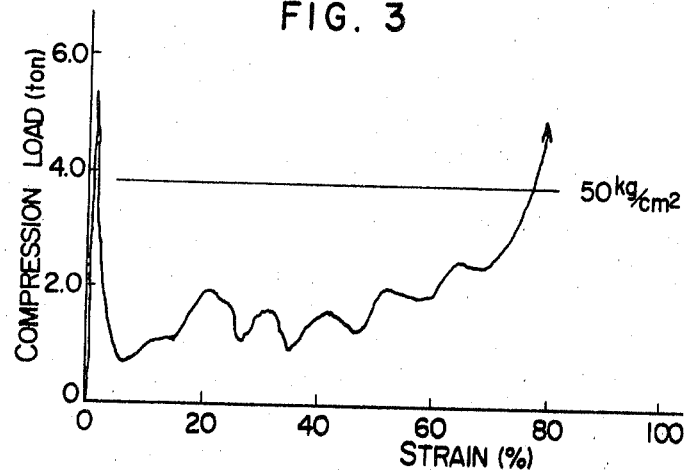

FIGS. 1 – 3 show compression load-strain curves.

It is, of course, desired in case of automobiles having a limited space that the shock absorber to be loaded is as small as and as light as possible and moreover has a greater energy absorbing efficiency. That is, such shock absorber as having a characteristic of deformation as shown by broken line in FIG. 1 is preferred.

The object of the present invention is to provide a small and light shock absorber having the desirable characteristics as mentioned above and a high energy absorbing efficiency.

The object of the present invention can be attained by filling a metallic hollow structure with a metal foamed product. For example, a shock absorber of a steel plate hollow case (thickness of plate: 0.8 mm cold-rolled carbon steel sheet, cross section: 88 × 88 mm and length: 430 mm) which is filled with aluminum foamed product (Al-7 percent Mg alloy having a density of 0.24 g/cm$^3$) is subjected to compression test by giving a load to the absorber in the direction parallel to the major axis thereof. As the result, the compression load-strain curve of FIG. 2 is obtained. It is clear that the absorber satisfies the characteristic as shown by the broken line in FIG. 1. A steel plate hollow case which is the same as used above, but which is not filled with aluminum foamed product is subjected to the same compression test as above to obtain a compression load-strain curve of FIG. 3 which shows that the absorber has the characteristics as shown by the solid line in FIG. 1. That is, a comparison of FIG. 2 and FIG. 3 clearly shows that the low compression strength of the absorber which is not filled with aluminum foamed product is increased to a level as high as that of yield point by filling an aluminum foamed product. Furthermore, compression strength of the aluminum foamed product itself is 40 kg/cm$^2$ and the aluminum foamed product in the shape of filled state displays a compression load of about 3 tons and the steel plate hollow case itself has a compression load of about 2 tons as shown in FIG. 3. However, the steel plate hollow case filled with the aluminum foamed product has a compression load of about 6 tons as shown in FIG. 2 and thus shows an effect which exceeds the sum of compression load of the steel plate hollow case and that of the aluminum foamed product. As mentioned above, the hollow case filled with the metal foamed product is nearly ideal as a shock absorber.

Figure 4:
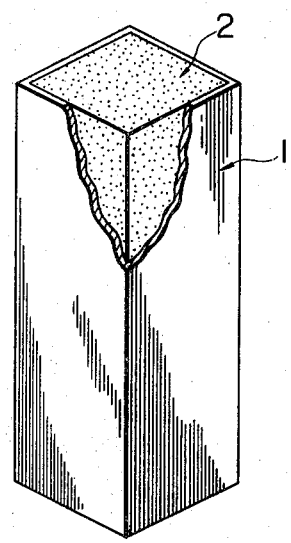

FIG. 4 is an oblique view of one embodiment of the present shock absorber in which 1 is a hollow structure of cold-rolled carbon steel sheet and 2 is foamed aluminum.

The material of the metal foamed product used in the present invention is preferably aluminum, copper, iron, zinc, magnesium, nickel or alloys thereof and the density of the metal foamed product is preferably less than one-half, generally one-fifth to one-twentieth of the density of the metal itself.

The metal foamed product is produced by the conventional art of foaming the metal and is fabricated in the desired structure. For example, the aluminum foamed product is produced by melting an aluminum-based alloy, admixing in the molten alloy an inert gas as a viscosity increasing agent such as air, nitrogen, carbon dioxide, argon or water, treating the viscous melt produced with a foaming agent such as titanium hydride and solidifing the resulting spongeous melt. (French Patent No. 2,035,676)

The mode of compression deformation of the metal foamed product is such that the foamed product itself is being broken and thus collapsed and it is not an elastic deformation. Therefore, upon bumping, the foamed product merely absorbs energy and does not exhibit an elastic repellence. This is the important property from viewpoint of protection of drivers. Furthermore, the metal foamed product shows substantially no changes in properties due to changes in temperature and time which are caused in case of organic foamed products. Therefore, when it is loaded in automobiles, the shock absorbing efficiency does not change regardless of the circumstance at which the automobiles are placed, namely, whether the torrid or frigid zone and of the period for which the absorber is used.

Metallic hollow structures of various shapes can be designed depending on the places at which they are applied and in some case, depending on design of the metallic hollow structure, the metal foamed product to be filled in the structure may be in a shape of narrow pillar. In such case, shearing rupture or buckling rupture may occur before uniform compression deformation occurs. In such case, the uniform compression deformation can be allowed to occur by inclining a part or whole of the face of the parallel to the main axis of the pillar-like metal foamed product into a pyramid frustrum shape. For example, when only the length of said steel plate hollow case is prolonged from 430 to 500 mm and the cross section is constant (88 × 88 mm), the aluminum foamed product to be filled sometimes causes shearing rupture or buckling rupture. Therefore, in order to increase reliability for uniform compression deformation, it is recommended to reduce one end cross section of the aluminum foamed product, e.g., to 50 × 50 mm to make it into a pyramid frustum shape. When the metallic hollow structure is in a cylindrical form, the foamed product can be similarly made into a cone frustum shape. The same idea can be applied to the metallic hollow structure having other sectional shapes.

Thus, energy absorbing efficiency of a shock absorber having metallic hollow structure can be remarkably increased by filling the hollow structure with a metal foamed product.

What is claimed is:
1. A shock absorber for automobiles which comprises a steel hollow structure which is filled with a foamed product of aluminum or its alloys.
2. The shock absorber of claim 1 wherein the density of said foamed product is from one-fifth to one-twentieth of the density of aluminum or its alloys.

* * * * *